(12) United States Patent  
Huang et al.

(10) Patent No.: US 11,301,088 B2  
(45) Date of Patent: Apr. 12, 2022

(54) FINGERPRINT MODULE INCLUDES IDENTIFICATION COMPONENTS IN AN IDENTIFICATION AREA AND A CHIP DISPOSED IN A NONIDENTIFICATION AREA AND DISPLAY DEVICE

(71) Applicant: WUHAN CHINA STAR OPTOELECTRONICS TECHNOLOGY CO., LTD., Hubei (CN)

(72) Inventors: Chunhung Huang, Wuhan (CN); Yaoli Huang, Wuhan (CN); Xinglong He, Wuhan (CN)

(73) Assignee: WUHAN CHINA STAR OPTOELECTRONICS TECHNOLOGY CO. LTD., Wuhan (CN)

( * ) Notice: Subject to any disclaimer, the term of this patent is extended or adjusted under 35 U.S.C. 154(b) by 699 days.

(21) Appl. No.: 16/317,231

(22) PCT Filed: Nov. 23, 2018

(86) PCT No.: PCT/CN2018/117092  
§ 371 (c)(1),  
(2) Date: Jan. 11, 2019

(87) PCT Pub. No.: WO2020/042394  
PCT Pub. Date: Mar. 5, 2020

(65) Prior Publication Data  
US 2021/0357070 A1 Nov. 18, 2021

(30) Foreign Application Priority Data  
Aug. 28, 2018 (CN) .......................... 201810989091.4

(51) Int. Cl.  
*G06F 3/042* (2006.01)  
*G06F 3/041* (2006.01)  
(Continued)

(52) U.S. Cl.  
CPC ........ *G06F 3/0421* (2013.01); *G02F 1/13338* (2013.01); *G06F 3/0325* (2013.01);  
(Continued)

(58) Field of Classification Search  
None  
See application file for complete search history.

(56) References Cited

U.S. PATENT DOCUMENTS

2013/0250202 A1* 9/2013 Qi .......................... G02F 1/1362  
349/58  
2015/0070323 A1* 3/2015 Hong .................. G06F 3/04162  
345/175  
(Continued)

FOREIGN PATENT DOCUMENTS

CN 207164735 U * 3/2018  
CN 207182337 U * 4/2018

*Primary Examiner* — Kirk W Hermann  
(74) *Attorney, Agent, or Firm* — Geoffrey A. Lottenberg; Berger Singerman LLP

(57) ABSTRACT

A fingerprint module includes a substrate, a plurality of fingerprint identification components, a fingerprint chip, and a plurality of metal wires. The substrate has an identification area configured to identify a fingerprint and a non-identification area located at a periphery of the identification area. The fingerprint identification components are disposed in the identification area of the substrate. The fingerprint chip is disposed in a non-identification area of the substrate. Each of the fingerprint identification components is electrically connected to the fingerprint chip through a corresponding metal wire.

10 Claims, 2 Drawing Sheets

(51) Int. Cl.
  *G02F 1/1333* (2006.01)
  *G06F 3/03* (2006.01)
  *G06F 3/047* (2006.01)
  *G06V 40/13* (2022.01)

(52) U.S. Cl.
  CPC .......... *G06F 3/047* (2013.01); *G06F 3/04164* (2019.05); *G06V 40/1318* (2022.01)

(56) References Cited

U.S. PATENT DOCUMENTS

| | | | | |
|---|---|---|---|---|
| 2015/0369661 | A1* | 12/2015 | Lin | G06K 9/0004 |
| | | | | 250/227.11 |
| 2016/0292487 | A1* | 10/2016 | Sun | G06K 9/0002 |
| 2019/0042017 | A1* | 2/2019 | Lu | G06F 3/041661 |
| 2019/0332842 | A1* | 10/2019 | Zhou | G06F 21/84 |
| 2019/0377446 | A1* | 12/2019 | Lin | G06K 9/00013 |

\* cited by examiner

FINGERPRINT MODULE INCLUDES IDENTIFICATION COMPONENTS IN AN IDENTIFICATION AREA AND A CHIP DISPOSED IN A NONIDENTIFICATION AREA AND DISPLAY DEVICE

FIELD OF INVENTION

The present disclosure relates to the field of fingerprint identification technologies, and more particularly to a fingerprint module and a display device.

BACKGROUND OF INVENTION

Fingerprints are textures formed by an uneven skin on fingertips of human fingers. Capacitive fingerprint identification is based on capacitance differences induced by depressed skin and raised skin of fingertips. By collecting the capacitance differences induced by the fingers pressing on a fingerprint reader, shapes of the fingerprints can be restored and fingerprint identification can be performed.

In the prior art, a technical solution of fingerprint identification provides adding a fingerprint identification device on a front surface or a back surface of a frame of the display device. The frame has, for example, a limited area of 10 $mm^2$. The fingerprint identification device has a small identification area. The fingerprint identification can only be done on the fingerprint identification device and is limited to within the limited area of 10 $mm^2$ of the frame, which is not flexible. In addition, additional fingerprint identification device increases the cost of the display device and increase the frame size of the display device.

Therefore, there is a need to provide a fingerprint module and a display device to solve technical problems of the prior art.

SUMMARY OF INVENTION

In order to solve the above technical problems, an embodiment of the present disclosure provide a fingerprint module. The fingerprint module includes a substrate, a plurality of fingerprint identification components, a fingerprint chip, and a plurality of metal wires. The substrate has an identification area configured to identify a fingerprint and a non-identification area located at a periphery of the identification area. The fingerprint identification components are disposed in the identification area of the substrate. The fingerprint chip is disposed in a non-identification area of the substrate. Each of the fingerprint identification components is electrically connected to the fingerprint chip through a corresponding metal wire. Material of the fingerprint identification component includes lead sulfide, indium antimonide, antimony doped gold, antimony doped mercury, antimony tin lead, or mercury cadmium telluride. The fingerprint identification components are arranged in a matrix.

According to an embodiment of the present disclosure, a fingerprint module includes a substrate, a plurality of fingerprint identification components, a fingerprint chip, and a plurality of metal wires. The substrate has an identification area configured to identify a fingerprint and a non-identification area located at a periphery of the identification area. The fingerprint identification components are disposed in the identification area of the substrate. The fingerprint chip is disposed in a non-identification area of the substrate. Each of the fingerprint identification components is electrically connected to the fingerprint chip through a corresponding metal wire.

In an embodiment of the present disclosure, material of the fingerprint identification component includes lead sulfide, indium antimonide, antimony doped gold, antimony doped mercury, antimony tin lead, or mercury cadmium telluride.

In an embodiment of the present disclosure, the fingerprint identification components are arranged in a matrix.

According to an embodiment of the present disclosure, a display device includes a fingerprint module, a display panel, and a backlight module, which are sequentially stacked. The fingerprint module includes a substrate, a plurality of fingerprint identification components, a fingerprint chip, and a plurality of metal wires. The substrate has an identification area configured to identify a fingerprint and a non-identification area located at a periphery of the identification area. The fingerprint identification components are disposed in the identification area of the substrate. The fingerprint chip is disposed in a non-identification area of the substrate. Each of the fingerprint identification components is electrically connected to the fingerprint chip through a corresponding metal wire.

In an embodiment of the present disclosure, material of the fingerprint identification component includes lead sulfide, indium antimonide, antimony doped gold, antimony doped mercury, antimony tin lead, or mercury cadmium telluride.

In an embodiment of the present disclosure, the fingerprint identification components are arranged in a matrix.

In an embodiment of the present disclosure, the backlight module includes a white light emitting diode and an infrared light emitting diode.

In an embodiment of the present disclosure, the backlight module includes a light guide plate, and the white light emitting diode and the infrared light emitting diode are disposed at a side of the light guide plate.

In an embodiment of the present disclosure, the display device further includes a first light guide plate and an infrared light emitting diode, the first light guide plate is disposed between the display panel and the fingerprint module, and the infrared light emitting diode is disposed at a side of the first light guide plate.

In an embodiment of the present disclosure, the backlight module includes a white light emitting diode and a second light guiding plate, and the white light emitting diode is disposed at a side of the second light guiding plate.

In an embodiment of the present disclosure, the display device further includes a first optical adhesive layer disposed between the fingerprint module and the display panel.

In an embodiment of the present disclosure, the display device further includes a cover plate disposed on the fingerprint module.

In an embodiment of the present disclosure, the display device further includes a second optical adhesive layer disposed between the cover plate and the fingerprint module.

In an embodiment of the present disclosure, the display panel includes an upper polarizer, a first substrate, a liquid crystal layer, a second substrate, and a lower polarizer, which are sequentially stacked.

In summary, beneficial effects of the embodiment of the present disclosure are as follows. Compared with the prior art, in order to solve the above technical problems, the fingerprint module and the display device of the embodiment of the present disclosure can increase a fingerprint identification area and achieve full-screen fingerprint identification through the fingerprint identification components disposed in the identification area of the substrate and the fingerprint chip disposed in a non-identification area of the substrate. In addition, the embodiment of the present disclosure can effectively reduce the frame of the display device, which is beneficial to the display device to increase a screen ratio and beneficial to a full screen design.

DETAILED DESCRIPTION OF PREFERRED EMBODIMENTS

Figure 1:
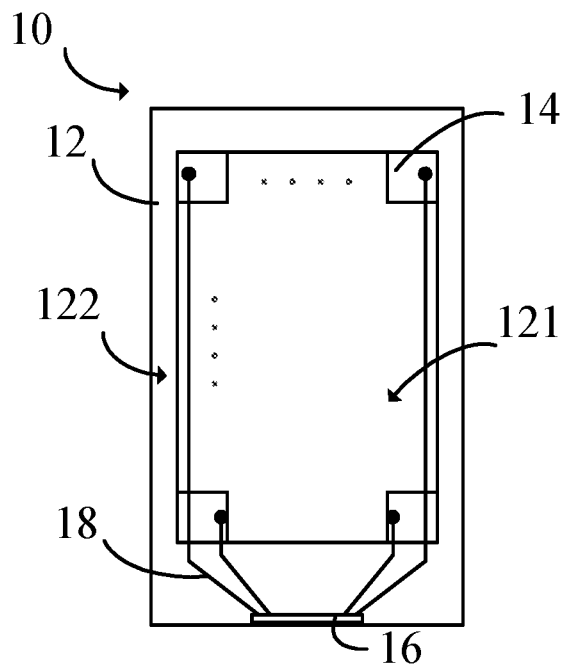
FIG. 1 is a schematic structural view of a fingerprint module according to an embodiment of the present disclosure.

The following description of the various embodiments is provided to illustrate the specific embodiments.

The embodiments described herein with reference to the accompanying drawings are explanatory, illustrative, and used to generally understand the present disclosure. Furthermore, directional terms described by the present disclosure, such as top, bottom, front, back, left, right, inner, outer, side, etc., are only directions by referring to the accompanying drawings, and thus the used terms are used only for the purpose of describing embodiments of the present disclosure and are not intended to be limiting of the present disclosure.

In the drawings, modules with similar structures are labeled with the same reference number.

Refer to FIG. 1, a schematic structural view of a fingerprint module according to an embodiment of the present disclosure is provided.

Referring to FIG. 1, in an embodiment of the present disclosure, a fingerprint module 10 includes a substrate 12, a plurality of fingerprint identification components 14, a fingerprint chip 16, and a plurality of metal wires 18. The substrate 12 has an identification area 121 configured to identify a fingerprint and a non-identification area 122 located at a periphery of the identification area 121. The fingerprint identification components 14 are disposed in the identification area 121 of the substrate 12. The fingerprint chip 16 is disposed in a non-identification area 122 of the substrate 12. Each of the fingerprint identification components 14 is electrically connected to the fingerprint chip 16 through a corresponding metal wire 18. The embodiment of the present disclosure can increase a fingerprint identification area and achieve full-screen fingerprint identification through the fingerprint identification components 14 disposed in the identification area 121 of the substrate 12 and the fingerprint chip 16 disposed in a non-identification area 122 of the substrate 12.

In details, material of the fingerprint identification components 14 include photovoltaic material. Photoelectric material includes infrared light detecting material for infrared photodetectors, such as lead sulfide, indium antimonide, antimony doped gold, antimony doped mercury, antimony tin lead, or mercury cadmium telluride. The fingerprint identification components 14 are arranged in a matrix. The fingerprint identification components 14 are, for example, a minimum fingerprint identification unit within the identification area 121.

In details, one end of each metal wire 18 is electrically connected to a corresponding fingerprint identification component 14, and another end of each metal wire 18 is electrically connected to the fingerprint chip 16. Each metal wire 18 spans the identification area 121 and the non-identification area 122 of the substrate 12.

In details, the fingerprint identification components 14 determine a magnitude of generated currents by absorbing an amount of infrared light, and the generated currents flow into the fingerprint chip 16 via the metal wire 18. The fingerprint chip 16 analyzes a relative magnitude of currents of each fingerprint identification component 14 to calculate a fingerprint texture image.

Figure 2:
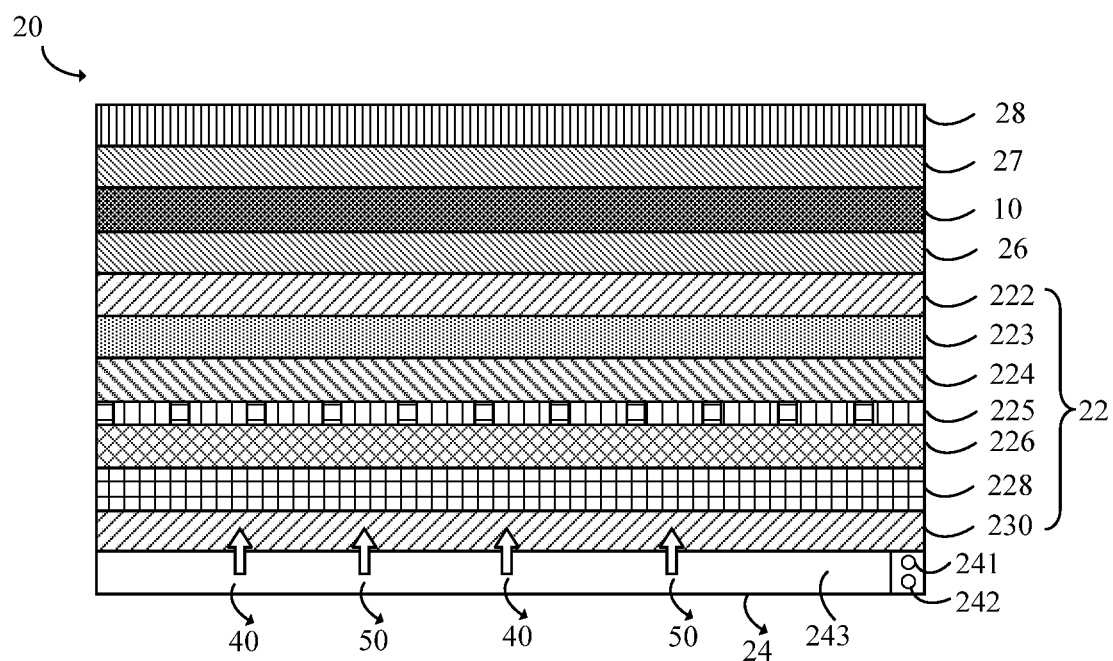
FIG. 2 is a schematic structural view of a display device according to an embodiment of the present disclosure.

Refer to FIG. 2, a schematic structural view of a display device according to an embodiment of the present disclosure is provided.

Referring to FIG. 2, a display device 20 of the embodiment of the present disclosure includes the fingerprint module 10, a display panel 22, and a backlight module 24, which are sequentially stacked. The specific structure and operation mode of the fingerprint module 10 are as illustrated in FIG. 1 and will not be repeatedly described herein.

The backlight module 24 includes a white light emitting diode 241 and an infrared light emitting diode 242. In details, the backlight module 24 includes a light guide plate 243, and the white light emitting diode 241 and the infrared light emitting diode 242 are disposed at a side of the light guide plate 243.

In details, the display device 20 further includes a first optical adhesive layer 26, a second optical adhesive 27, and a cover plate 28. The first optical adhesive layer 26 is disposed between the fingerprint module 10 and the display panel 22. The first optical adhesive layer 26 is configured to bond the fingerprint module 10 and the display panel 22 to stably fix the fingerprint module 10 on the display panel 22. The cover plate 28 is disposed on the fingerprint module 10 for protecting the fingerprint module 10. The second optical adhesive layer 27 is disposed between the cover plate 28 and the fingerprint module 10. The second optical adhesive layer 27 is configured to bond the cover plate 28 and the fingerprint module 10 to stably fix the cover plate 28 to the fingerprint module 10 to protect the fingerprint module 10.

In details, the first optical adhesive layer 26 and the second optical adhesive layer 27 are, for example, an optically clear adhesive (OCA).

In details, the display panel 22 includes an upper polarizer 222, a shielding layer 223, a first substrate 224, a liquid crystal layer 226, a second substrate 228, and a lower polarizer 230, which are sequentially stacked. The first substrate 224 is disposed opposite to the second substrate 228. The liquid crystal layer 226 is interposed between the first substrate 224 and the second substrate 228. In the embodiment, the first substrate 224 is a color filter (CF) substrate including a filter layer 225, and the second substrate 228 is a thin film transistor (TFT) substrate. The upper polarizer 222 is disposed between the fingerprint module 10 and the first substrate 224, and the lower polarizer 230 is disposed between the backlight module 24 and the second substrate 228. The upper polarizer 222 can pass light having a polarization direction in a first direction, and the lower polarizer 230 can pass light having a polarization direction in a second direction perpendicular to the first direction.

In details, the backlight module 24 can simultaneously emit uniform white visible light 40 and uniform infrared light 50 through the white light emitting diode 241 and the infrared light emitting diode 242. When the uniform infrared light is irradiated onto the fingerprint identification components 14 in the fingerprint module 10, all the fingerprint identification components 14 generate currents of same magnitude, and the currents at this time are a baseline current, and the fingerprint chip 16 records the baseline current. When there is a finger touch on the cover plate 28, reflection intensities of fingerprint patterns to the infrared light are different, and intensities of the reflected infrared light on the different fingerprint identification components 14 are different. The currents at this time are induced currents (raw data). The fingerprint chip 16 records the induced currents currently. The currents generated by the fingerprint are equal to a difference between the induced currents and the baseline current. The fingerprint chip 16 converts the difference between the induced currents and the baseline current into a fingerprint image.

Figure 3:
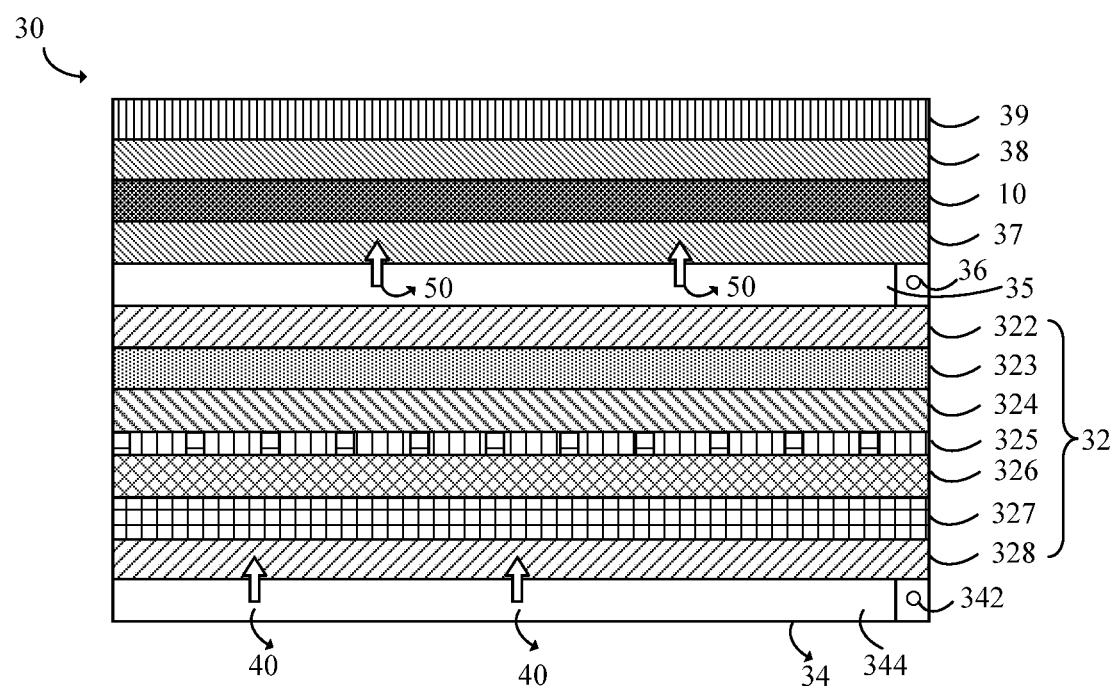
FIG. 3 is a schematic structural view of a display device according to another embodiment of the present disclosure.

Refer to FIG. 3, a schematic structural view of a display device according to another embodiment of the present disclosure is provided.

Referring FIG. 3, a display device 30 of the embodiment of the present disclosure includes the fingerprint module 10, a display panel 32, and a backlight module 34, which are sequentially stacked. The specific structure and operation mode of the fingerprint module 10 are as illustrated in FIG. 1 and will not be repeatedly described herein.

In details, the display device 30 further includes a first light guide plate 35 and an infrared light emitting diode 36. The first light guide plate 35 is disposed between the display panel 32 and the fingerprint module 10, and the infrared light emitting diode 36 is disposed at a side of the first light guide plate 35. The backlight module 34 includes a white light emitting diode 342.

In details, the backlight module 34 includes a second light guide plate 344 disposed at a side of the second light guide plate 344.

In details, the display device 30 further includes a first optical adhesive layer 37, a second optical adhesive 38, and a cover plate 39. The first optical adhesive layer 37 is disposed between the fingerprint module 10 and the display panel 32. The first optical adhesive layer 37 is configured to bond the fingerprint module 10 and the display panel 32 to stably fix the fingerprint module 10 on the display panel 32. The cover plate 39 is disposed on the fingerprint module 10 for protecting the fingerprint module 10. The second optical adhesive layer 38 is disposed between the cover plate 39 and the fingerprint module 10. The second optical adhesive layer 38 is configured to bond the cover plate 39 and the fingerprint module 10 to stably fix the cover plate 39 to the fingerprint module 10 to protect the fingerprint module 10.

In details, the first optical adhesive layer 37 and the second optical adhesive layer 38 are, for example, an optically clear adhesive (OCA).

In details, the display panel 32 includes an upper polarizer 322, a shielding layer 323, a first substrate 324, a liquid crystal layer 326, a second substrate 328, and a lower polarizer 330, which are sequentially stacked. The first substrate 324 is disposed opposite to the second substrate 328. The liquid crystal layer 326 is interposed between the first substrate 324 and the second substrate 328. In the embodiment, the first substrate 324 is a color filter (CF) substrate including a filter layer 325, and the second substrate 328 is a thin film transistor (TFT) substrate. The first light guide plate 35 is disposed between the upper polarizer 322 and the fingerprint module 10. The upper polarizer 322 is disposed between the fingerprint module 10 and the first substrate 324, and the lower polarizer 330 is disposed between the backlight module 24 and the second substrate 328. The upper polarizer 322 can pass light having a polarization direction in a first direction, and the lower polarizer 330 can pass light having a polarization direction in a second direction perpendicular to the first direction.

In details, the white light emitting diode 342 of the backlight module 34 emits uniform white visible light 40. The first light guide plate 35 between the upper polarizer 322 and the fingerprint module 10 converts a point light source of the infrared light emitting diode 36 into a surface light source that is uniformly illuminated upward. When a uniform infrared light 50 is irradiated onto the fingerprint identification components 14 in the fingerprint module 10, all the fingerprint identification components 14 generate currents of same magnitude, and the currents at this time are a baseline current, and the fingerprint chip 16 records the baseline current. When there is a finger touch on the cover plate 28, reflection intensities of fingerprint patterns to the infrared light are different, and intensities of the reflected infrared light on the different fingerprint identification components 14 are different. The currents at this time are induced currents (raw data). The fingerprint chip 16 records the induced currents currently. The currents generated by the fingerprint are equal to a difference between the induced currents and the baseline current. The fingerprint chip 16 converts the difference between the induced currents and the baseline current into a fingerprint image.

In summary, the fingerprint module and the display device of the embodiment of the present disclosure can increase a fingerprint identification area and achieve full-screen fingerprint identification through the fingerprint identification components disposed in the identification area of the substrate and the fingerprint chip disposed in a non-identification area of the substrate. In addition, the embodiment of the present disclosure can effectively reduce the frame of the display device, which is beneficial to the display device to increase a screen ratio and beneficial to a full screen design.

Although the present disclosure is described via one or more embodiments, those of ordinary skill in the art can come up with equivalent variations and modifications based upon the understanding of the specification and the accompanying drawings. The present disclosure includes all such modifications and variations, and is only limited by the scope of the appended claims. In particular, as to the various functions performed by the components described above, the terms used to describe the components are intended to correspond to any component performing the specific functions (e.g., which are functionally equivalent) of the components (unless otherwise indicated), even those which are structurally different from the disclosed structure for performing the functions in the exemplary embodiments in the specification shown herein. In addition, although a particular feature in the specification is disclosed in only one of many embodiments, this feature may be combined with one or more features in other embodiments which are desirable and advantageous to a given or particular application. Moreover, the terms "include", "have", "consist of", or variations thereof used in the detailed description or the claims are intended to be used in a manner similar to the term "comprising".

In summary, although the preferable embodiments of the present disclosure have been disclosed above. It should be noted that those of ordinary skill in the art can make a variety of improvements and substitutions on the premise of not deviating from the technical principle of the present disclosure, and these improvements and substitutions should be encompassed within the protection scope of the present disclosure.

The invention claimed is:

1. A display device, comprising:
   a fingerprint module, a display panel, and a backlight module, which are sequentially stacked, wherein the fingerprint module comprises:
   a substrate having an identification area configured to identify a fingerprint and a non-identification area located at a periphery of the identification area;
   a plurality of fingerprint identification components disposed in the identification area of the substrate;
   a fingerprint chip disposed in the non-identification area of the substrate; and
   a plurality of metal wires, each of the fingerprint identification components electrically connected to the fingerprint chip through a corresponding metal wire;
   wherein the display device further comprises a first light guide plate and an infrared light emitting diode, the first light guide plate is disposed between the display panel and the fingerprint module, and the infrared light emitting diode is disposed at a side of the first light guide plate.

2. The display device according to claim 1, wherein material of the fingerprint identification component comprises lead sulfide, indium antimonide, antimony doped gold, antimony doped mercury, antimony tin lead, or mercury cadmium telluride.

3. The display device according to claim 1, wherein the fingerprint identification components are arranged in a matrix.

4. The display device according to claim 1, wherein the backlight module comprises a white light emitting diode and an infrared light emitting diode.

5. The display device according to claim 4, wherein the backlight module comprises a light guide plate, and the white light emitting diode and the infrared light emitting diode are disposed at a side of the light guide plate.

6. The display device according to claim 1, wherein the backlight module comprises a white light emitting diode and a second light guiding plate, and the white light emitting diode is disposed at a side of the second light guiding plate.

7. The display device according to claim 1, further comprising a first optical adhesive layer disposed between the fingerprint module and the display panel.

8. The display device according to claim 1, further comprising a cover plate disposed on the fingerprint module.

9. The display device according to claim 8, further comprising a second optical adhesive layer disposed between the cover plate and the fingerprint module.

10. The display device according to claim 1, wherein the display panel comprises an upper polarizer, a first substrate, a liquid crystal layer, a second substrate, and a lower polarizer, which are sequentially stacked.

* * * * *